(12) United States Patent
Capper (10) Patent No.: US 11,310,095 B2
(45) Date of Patent: Apr. 19, 2022

(54) REMOTE IN-BAND MANAGEMENT OF A NETWORK INTERFACE CONTROLLER

(71) Applicant: Arista Networks, Inc., Santa Clara, CA (US)

(72) Inventor: Simon Francis Capper, San Jose, CA (US)

(73) Assignee: ARISTA NETWORKS, INC., Santa Clara, CA (US)

( * ) Notice: Subject to any disclaimer, the term of this patent is extended or adjusted under 35 U.S.C. 154(b) by 69 days.

(21) Appl. No.: 15/873,672

(22) Filed: Jan. 17, 2018

(65) Prior Publication Data

US 2019/0222468 A1 Jul. 18, 2019

(51) Int. Cl.
| | |
|---|---|
| *H04L 12/24* | (2006.01) |
| *H04L 29/08* | (2006.01) |
| *G06F 9/50* | (2006.01) |
| *H04L 12/64* | (2006.01) |
| *G06F 3/06* | (2006.01) |
| *H04L 12/937* | (2013.01) |
| *H04L 41/046* | (2022.01) |

(Continued)

(52) U.S. Cl.
CPC .......... *H04L 41/046* (2013.01); *G06F 3/0653* (2013.01); *H04L 12/6418* (2013.01); *H04L 41/0806* (2013.01); *H04L 49/254* (2013.01); *H04L 67/16* (2013.01); *G06F 9/5077* (2013.01); *H04L 49/15* (2013.01)

(58) Field of Classification Search
CPC . H04L 41/046; H04L 12/6418; H04L 49/254; H04L 67/16; H04L 49/15; H04L 41/12; H04L 41/0853; H04L 41/0806; H04L 45/74; H04L 61/10; G06F 3/0653; G06F 9/5077

See application file for complete search history.

(56) References Cited

U.S. PATENT DOCUMENTS 7,143,159 B1 * 11/2006 Grace ................. H04L 41/0213
709/224
2001/0044822 A1 * 11/2001 Nishio .................... H04L 43/00
709/202

(Continued)

OTHER PUBLICATIONS

International Search Report and Wri 1 1EN Opinion, Application No. PCT/US2018/068230, dated Apr. 12, 2019, 10pages.

(Continued)

*Primary Examiner* — Lesa M Kennedy
(74) *Attorney, Agent, or Firm* — Fountainhead Law Group P.C.

(57) ABSTRACT

A method and apparatus of a network element that manages a network interface controller on a device coupled to a network element is described. In an exemplary embodiment, the network element detects that the network interface controller is manageable, wherein the network interface controller is coupled to the network element by a link. In addition, the network element transmits a command packet to the network interface controller in-band, where the network interface controller determines a response to the command packet using the resources of the network interface controller and without communicating data between the network interface controller and the device. The network element receives the response from the network interface controller.

20 Claims, 6 Drawing Sheets

(51) Int. Cl.
    *H04L 67/51*     (2022.01)
    *H04L 49/253*     (2022.01)
    *H04L 41/0806*     (2022.01)
    *H04L 12/933*     (2013.01)
    *H04L 49/15*     (2022.01)

(56) References Cited

U.S. PATENT DOCUMENTS

| | | | | |
|---|---|---|---|---|
| 2005/0190783 | A1* | 9/2005 | Khosravi | H04L 69/163 370/438 |
| 2006/0080672 | A1* | 4/2006 | Smith | G06F 9/5011 719/317 |
| 2008/0098321 | A1 | 4/2008 | Krithivas | |
| 2010/0232443 | A1 | 9/2010 | Pandey | |
| 2011/0040917 | A1* | 2/2011 | Lambert | H04L 69/14 710/301 |
| 2011/0103344 | A1* | 5/2011 | Gundavelli | H04W 8/005 370/331 |
| 2011/0173285 | A1* | 7/2011 | Cripe | H04L 49/354 709/207 |
| 2011/0213863 | A1 | 9/2011 | Shah et al. | |
| 2011/0283006 | A1 | 11/2011 | Ramamurthy | |
| 2012/0079478 | A1* | 3/2012 | Galles | H04L 47/2441 718/1 |
| 2014/0056141 | A1* | 2/2014 | Breternitz, Jr. | H04L 47/10 370/235 |
| 2014/0344430 | A1 | 11/2014 | Ayanam et al. | |
| 2014/0351812 | A1* | 11/2014 | Imai | H04L 12/4633 718/1 |
| 2015/0271244 | A1 | 9/2015 | Bloch et al. | |
| 2017/0161090 | A1* | 6/2017 | Kodama | G06F 9/45558 |
| 2018/0336042 | A1* | 11/2018 | Rathineswaran | G06F 9/4406 |
| 2019/0104029 | A1* | 4/2019 | Guim Bernat | H04L 41/5003 |

OTHER PUBLICATIONS

Related application European Extended Search Report,; European Patent Application No. 18901668.6 dated Aug. 13, 2021; 10 pages.
Tausanovitch, et al.; "SmartNICs: Give your OpenStack Network a Boost"; Retrieved from the Internet: URL:https://www.infoworid.com/article/3125 022/smartnics-give-your-openstack-network-a-boost.html; 6 page; Aug. 4, 2021.

* cited by examiner

REMOTE IN-BAND MANAGEMENT OF A NETWORK INTERFACE CONTROLLER

FIELD OF INVENTION

This invention relates generally to data networking, and more particularly, to remote in-band management of a network interface controller of a device by a network element.

BACKGROUND OF THE INVENTION

A network element can manage the ports of the network element so as to determine statistics maintained by each port, configure each port, and to apply, delete, and/or change policies for those ports. For example, the network element can retrieve statistics such as packets received, packets transmitted, packets dropped, error packets received, and/or other types of statistics. In addition, the network element can configure each port and further apply different types of policies on each port, such as a Quality of Service policy, Access Control Lists, traffic policers, and/or other types of policies for a port of the network element.

A network element can be coupled to one or more devices via links between the network element and the respective device. Each of these coupled devices can include a network interface controller (NIC) that receives and transmits network data for the device. The network element, however, cannot manage the NIC of the coupled device unless that device exposes a mechanism for managing the NIC that utilizes the computing resources of the device (e.g., the central processing unit (CPU), system memory) or uses an out-of-band management system (e.g., (e.g., intelligent platform management interface (IPMI)).

SUMMARY OF THE DESCRIPTION

A method and apparatus of a network element that manages a network interface controller on a device coupled to a network element is described. In an exemplary embodiment, the network element detects that the network interface controller is manageable, wherein the network interface controller is coupled to the network element by a link. In addition, the network element transmits a command packet to the network interface controller in-band, where the network interface controller determines a response to the command packet using the resources of the network interface controller and without communicating data between the network interface controller and the device. The network element receives the response from the network interface controller.

In a further embodiment, a network interface controller receives a packet from the network element via a link that couples the device and the network element. In addition, the network interface controller forwards the packet to an agent that is executing on the network interface controller, wherein the agent determines a response to the command packet without the network interface controller communicating data between the network interface controller and the device, wherein the packet includes a command and the agent processes a command. The network interface controller transmits the response from the agent to the network element via the link.

Other methods and apparatuses are also described.

BRIEF DESCRIPTION OF THE DRAWINGS

The present invention is illustrated by way of example and not limitation in the Figures of the accompanying drawings in which like references indicate similar elements.

DETAILED DESCRIPTION

A method and apparatus of a network element that manages a network interface controller on a device coupled to a network element is described. In the following description, numerous specific details are set forth to provide thorough explanation of embodiments of the present invention. It will be apparent, however, to one skilled in the art, that embodiments of the present invention may be practiced without these specific details. In other instances, well-known components, structures, and techniques have not been shown in detail in order not to obscure the understanding of this description.

Reference in the specification to "one embodiment" or "an embodiment" means that a particular feature, structure, or characteristic described in connection with the embodiment can be included in at least one embodiment of the invention. The appearances of the phrase "in one embodiment" in various places in the specification do not necessarily all refer to the same embodiment.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The processes depicted in the figures that follow, are performed by processing logic that comprises hardware (e.g., circuitry, dedicated logic, etc.), software (such as is run on a general-purpose computer system or a dedicated machine), or a combination of both. Although the processes are described below in terms of some sequential operations, it should be appreciated that some of the operations described may be performed in different order. Moreover, some operations may be performed in parallel rather than sequentially.

The terms "server," "client," and "device" are intended to refer generally to data processing systems rather than specifically to a particular form factor for the server, client, and/or device.

A method and apparatus of a network element that manages a network interface controller on a device coupled to a network element is described. In one embodiment, the network element detects that a network interface controller (NIC) of device is manageable by the network element, where the NIC is coupled to the network element via a link. In one embodiment, the NIC executes an agent using a processor and/or other the resources of the NIC and without using the processor (or other computing resources) of the device (e.g., a central processing unit, system memory, or communications channel between the NIC and device). In one embodiment, the network element can send one or more commands that are processed by the agent to manage the NIC. In this embodiment, by sending the commands to the agent, the network element can manage the NIC, such as getting a statistics value maintained by the NIC, getting a configuration value of the NIC, setting a configuration value of the NIC, setting a policy of the NIC, and/or getting a policy of the NIC. In one embodiment, with this ability of the network element to manage the NIC via commands sent to the agent executing on the NIC, the NIC appears as a port of the network element.

In another embodiment, the device can include one or more virtual machines and/or containers executing on the device. In this embodiment, a virtual machine is an emulation of a computer system by providing functionality needed to execute entire operating systems and a container is a namespace instance of an operating system level virtualization In addition, each of the virtual machines and/or containers can include a virtual NIC (VNIC). In this embodiment, a VNIC logically connects the corresponding virtual machine or container to the NIC, so that the corresponding virtual machine or container can transmit or receive network data using the NIC. In one embodiment, the VNIC is a resource of the NIC. In one embodiment, because the VNIC is a resource of the NIC, the network element can manage each of the VNICs. In this embodiment, the network element could keep track of the number of instantiated VNICs on the device, track when VNIC is instantiated, when a VNIC is deactivated, and/or determine statistics of the individual VNICs (e.g., network data received, network data transmits, network data dropped, error packets, and/or other types of statistics on a per-VNIC level). In addition, the network element could apply policies on a per VNIC-level (e.g. QoS policies, ACLs, policers, and/or other types of policies.). For example and in one embodiment, the network element 106 can apply ACLs for different VNICs or a policer for one or more of the VNICs.

Figure 1:
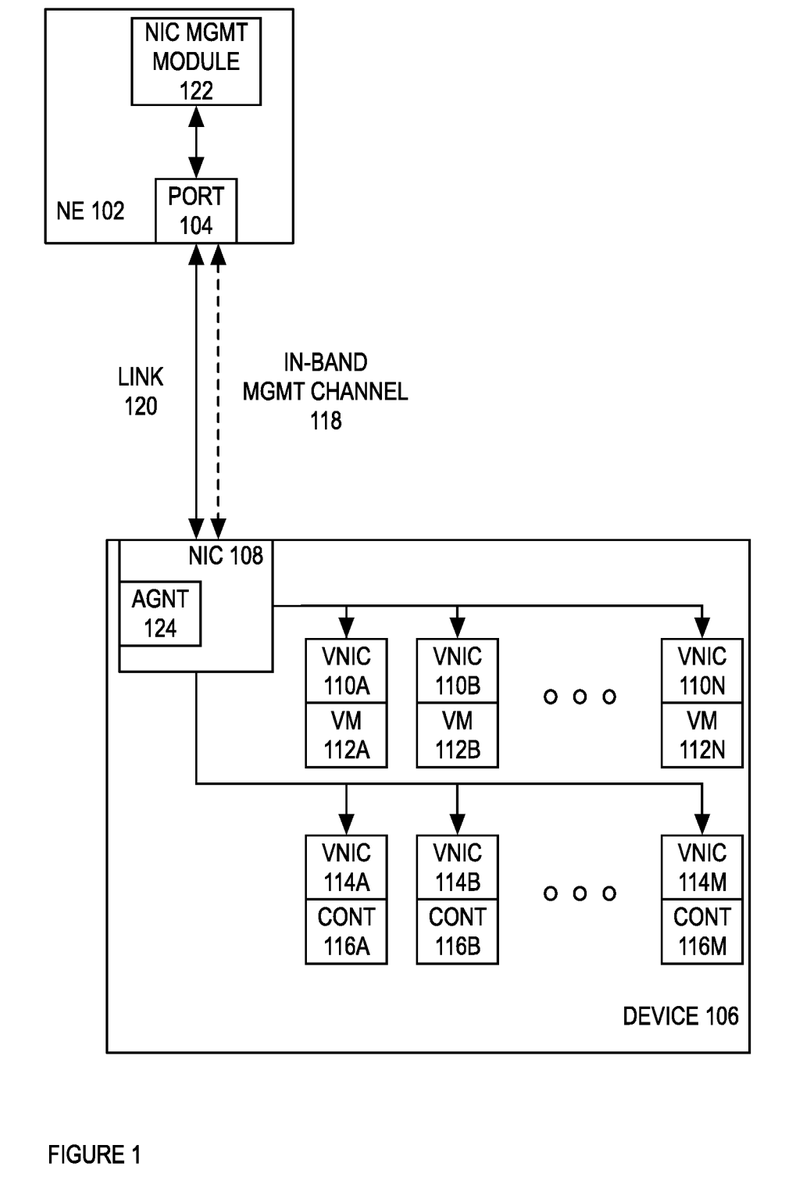
FIG. 1 is a block diagram of one embodiment of a system of a network element that remotely manages a network interface controller (NIC) of a device in-band over a link.
Figure 5:
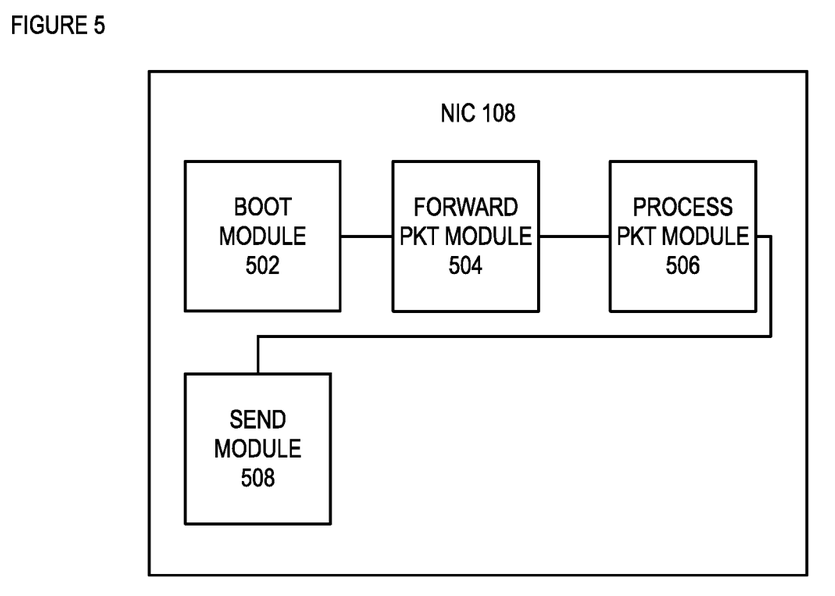
FIG. 5 is a block diagram of one embodiment of a NIC that receives a command packet from a network element that is processed by an agent on the NIC.

FIG. 1 is a block diagram of one embodiment of a system 100 of a network element 102 that remotely manages a NIC 108 of a device 106 in-band over a link 120. In FIG. 5, the network element 102 is coupled to the device 106 via link 120. In one embodiment, the network element can be a switch, router, hub, bridge, gateway, etc., or any type of device that can communicate data packets with a network. In one embodiment, the device 106 can be a personal computer, laptop, server, mobile device (e.g., smartphone, laptop, personal digital assistant, music playing device, gaming device, etc.), and/or any device capable requesting a search and/or displaying search results. In one embodiment, the device 106, and/or network element 102 can be a physical or virtual device. While in one embodiment, the link can be a wired connection (e.g., copper, fiber, etc.,), in alternate embodiments, a different type of interconnection is used (e.g., wireless, a combination of wireless and wired, etc.). In addition, different types of protocols can be used to communicate network data over the connection (e.g., Ethernet, wireless, Synchronous Optical Networking (SONET), Fiber channel, Infiniband, etc.). In one embodiment, network element 102 communicates network data with the device 106 using a variety of communicating techniques (e.g., layer 2 switching, layer 3 routing, traffic shaping, applying a quality of service (QoS) policy, etc.).

In one embodiment, the device 106 includes a NIC 108 is a hardware component that couples the device 106 to a network, such as the link 120 that couples the device 106 to the network element 102. The NIC 108 includes one or more interfaces that are used to transmit and receive the network data. For example and in one embodiment, the NIC can includes one or more Ethernet interface that have a data rate (e.g., 10/100 megabits/second (Mbps), 1 gigabit/second (Gbs), 10 Gbs, or another data rate). In one embodiment, the device 106 can include a virtual machine (e.g., virtual machines 112A-N) and/or a container (e.g., containers 116A-M). In this embodiment, a virtual machine is an emulation of a computer system by providing functionality needed to execute entire operating systems. A hypervisor uses native execution to share and manage hardware, allowing for multiple environments which are isolated from one another, yet exist on the same physical machine (e.g., device 106). In one embodiment, a container 116A-M is a namespace instance of an operating system level virtualization In this embodiment, the container 116A-M is used for deploying and running processes without launching an entire virtual machine for each of these processes. Instead, these isolated containers 116A-M are run on a single device operating system and access the kernel of the device operating system. In one embodiment, each of the virtual machines 112A-N and/or containers 116A-M can include a virtual NIC (VNIC) (e.g., VNICs 110A-N and/or VNICs 114A-M). In this embodiment, a VNIC logically connects the corresponding virtual machine or container to the NIC 108, so that the corresponding virtual machine or container can transmit or receive network data using the NIC 108. In one embodiment, the VNIC is a resource of the NIC 108.

In one embodiment, the network element 102 manages the NIC 108 of the device 106 without using an out of band management scheme (e.g., IPMI), or by using a management scheme that utilizes the CPU of the device 106. In this embodiment, it is useful for the network element 102 to manage the functions of the NIC directly. For example and in one embodiment, it is useful for the network element to have access to the counters of the NIC 108, so as to determine the statistics being kept by the NIC 108 (e.g. count the number of error packets being received by the NIC 108). In addition, the network element 102 can apply policies to the NIC 108, so as quality of service (QoS) to traffic being transmitted. Alternatively, the network element 102 can apply access control lists (ACLs) to the network data being transmitted and received by the NIC 108. In one embodiment, because a VNIC of the device is a resource of the NIC 108, if the network element 102 can manage the NIC 108, the network element 102 would be able to manage any configured VNICs. In this embodiment, the network element 102 could keep track of the number of instantiated VNICs on the device, track when VNIC is instantiated, when a VNIC is deactivated, and/or determine statistics of the individual VNICs (e.g., network data received, network data transmits, network data dropped, error packets, and/or other types of statistics on a per-VNIC level). In addition, the network element 102 could apply policies on a per VNIC-level (e.g. QoS policies, ACLs, policers, and/or other types of policies.). For example and in one embodiment, the network element 102 can apply ACLs for different VNICs or a policer for one or more of the VNICs.

The NIC 108 can include, in one embodiment, a processor (not illustrated) that execute processes using the resources of the NIC 108 and without using the computing resources of device 106 (e.g., CPU, operating system, system memory, communications channel coupling the NIC 108 to a processor of the device 106, and/or other computing resources). For example and in one embodiment, a processor on the NIC 108 can process a command packet from the network element 102 without requiring any integration or support from the device that extends the functionality of the NIC. Alternatively, the NIC 108 can execute the command packet from the network element 102 without requiring special hardware or software changes or updates the device other than the NIC 108 itself (e.g., the NIC 108 does not require a special driver running on the device 106, use of a communications channel coupling the NIC 108 to the device 106, by communicating data between the NIC 108 and the device 106, a separate management channel between the NIC 108 and the device 106, and/or any special software or hardware change to the device 106). In this embodiment, the NIC 108 executed processes uses the processor and memory of the NIC 108 and does not use the CPU, operating system, system memory, and/or other computing resources of the device 106. In one embodiment, the NIC 108 uses the power resources of device 106 so as to provide power to the NIC 108. In one embodiment, the NIC 108 executes an agent 124 that can be used by the network element to manage the NIC 108. In this embodiment, the network element 102 sends a command via the port 104. The agent 124 receives the command, executes the command using the resources of the NIC 108 (e.g., NIC 108 processor, memory, operating system, and/or other resources of the NIC 108), and sends the results of the command back to the network element 102. For example and in one embodiment, the command for the agent 124 can be a command to collect one or more different statistics kept by the NIC 108 (e.g., overall statistics or per-VNIC statistics), apply a policy to the NIC (e.g., QoS, ACL, policer, and/or another type of policy), and/or a per-VNIC policy (e.g., QoS, ACL, policer, and/or another type of policy for one or more VNICs).

In one embodiment, with the agent 124 on the NIC 108, the network element 102 can detect that the NIC 108 is manageable by sending a discovery packet through the port 104 which the agent 124 on the NIC 108 responds to. Once the network element 102 has received a response from the agent 124 on the NIC 108, the network element 102 has discovered the manageable NIC 108. In another embodiment, the network element 108 can receive an advertisement from the NIC 108 indicating that the NIC 108 is a manageable NIC 108 that is coupled to the port 104 of the network element 102. In one embodiment, the network element 102 can send the discovery packet out one or more ports of the network element 102 that are coupled to network element 102. In one embodiment, the network element 102 sends the discovery packet on each port coupled to another device. With this manageable NIC 108, the network element 102 can set this NIC 108 as manageable, and sends one or more commands to the agent. In one embodiment, the network element 102 sends the command using a layer 2 encapsulated packet with a non-forwardable destination address. In one embodiment, the non-forwardable destination address is a multicast Media Access Control (MAC) address, an Internet Protocol (IP) multicast address, or an IP link local address. In this embodiment, the agent is associated with the non-forwardable address and the NIC 108 forwards this packet to the agent 124 and not to the CPU of the device 106. By using a non-forwardable address for the agent, the network element 102 is the device that can originate the commands for the agent and send these packets. If another device coupled to the network element 102 sends a packet to the network element using this non-forwardable address, the network element 102 would drop this packet. In one embodiment, by restricting the agent to this non-forwardable address, another device cannot manage the NIC 108, just the network element 102. Processing the commands for the agent is further described in FIGS. 2 and 3 below. In one embodiment, a NIC management module 122 detects the NIC, sends the commands, and processes the results.

Figure 2:
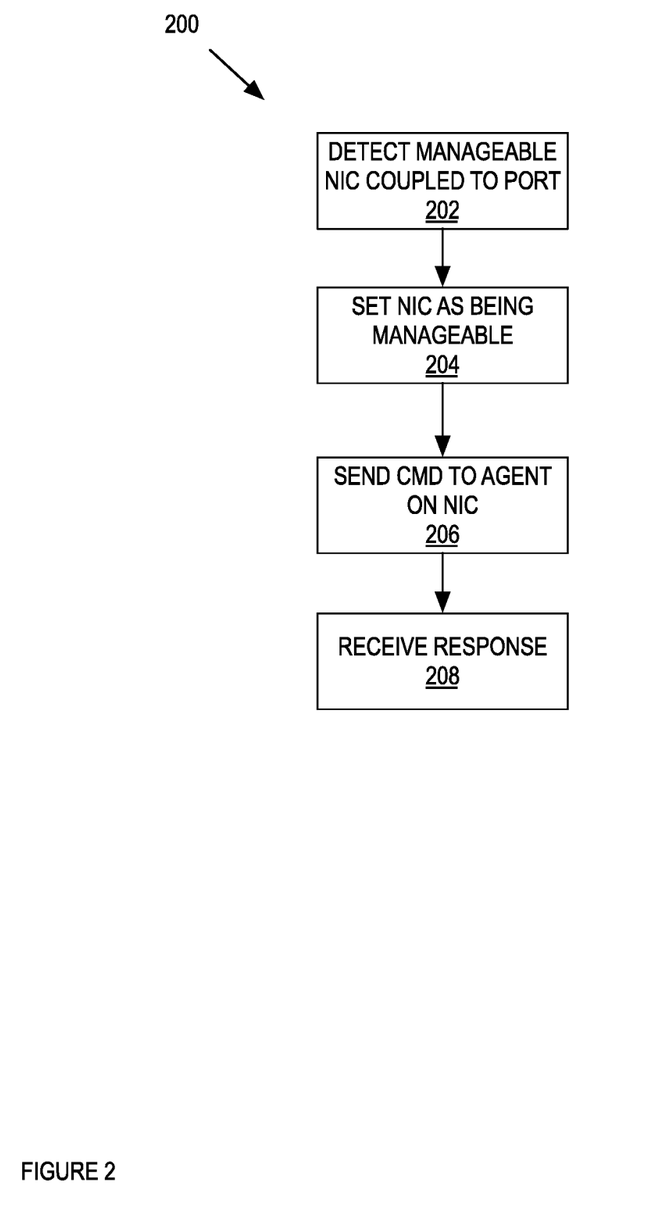
FIG. 2 is a flow diagram of one embodiment of a process to send a command packet to a device NIC that is used to manage the NIC.

FIG. 2 is a flow diagram of one embodiment of a process 200 to send a command packet to a device NIC that is used to manage the NIC. In one embodiment, process 200 is performed by a NIC management module of a network element, such as the NIC management module 122 as described in FIG. 1 above. In FIG. 2, process 200 begins by detecting that the NIC of a device is manageable at block 202. In one embodiment, process 200 detects the NIC by sending a discovery packet through the port which the agent on the NIC responds to. Once process 200 has received a response from the agent on the NIC, process 200 has discovered the manageable NIC. In another embodiment, process 200 can receive an advertisement from the NIC indicating that the NIC is a manageable NIC that is coupled to the port of the network element. At block 204, process 200 sets this NIC as manageable. In one embodiment, by setting this NIC as manageable, the NIC will appear in management user interfaces associated with the network element, so this NIC can be managed (e.g., via a command line interface, management user interface, network management station, and/or another management user interface). Process 200 receives a command for the NIC at block 206. Process 200 sends the command packet and block 206. In one embodiment, the command in the command packet can be a get statistic command, get NIC configuration, set NIC configuration, get/set policies (e.g., QoS, ACL, policer, and/or other policy for the NIC overall and/or on an individual VNIC basis), and/or other types of commands for the NIC. In one embodiment, the command is stored in a Forwarding and Control Element Separation protocol format. In one embodiment, the packet includes the multicast address of the associated with the agent as the destination address. In one embodiment, process 200 sends the packet on the link that couples the network element and the device. In another embodiment, process 200 can send the command packet (e.g., the discovery packet) out one or more ports of the network element. At block 208, process 200 receives the response from the agent on the NIC. In one embodiment, the network element processes the response.

Figure 3:
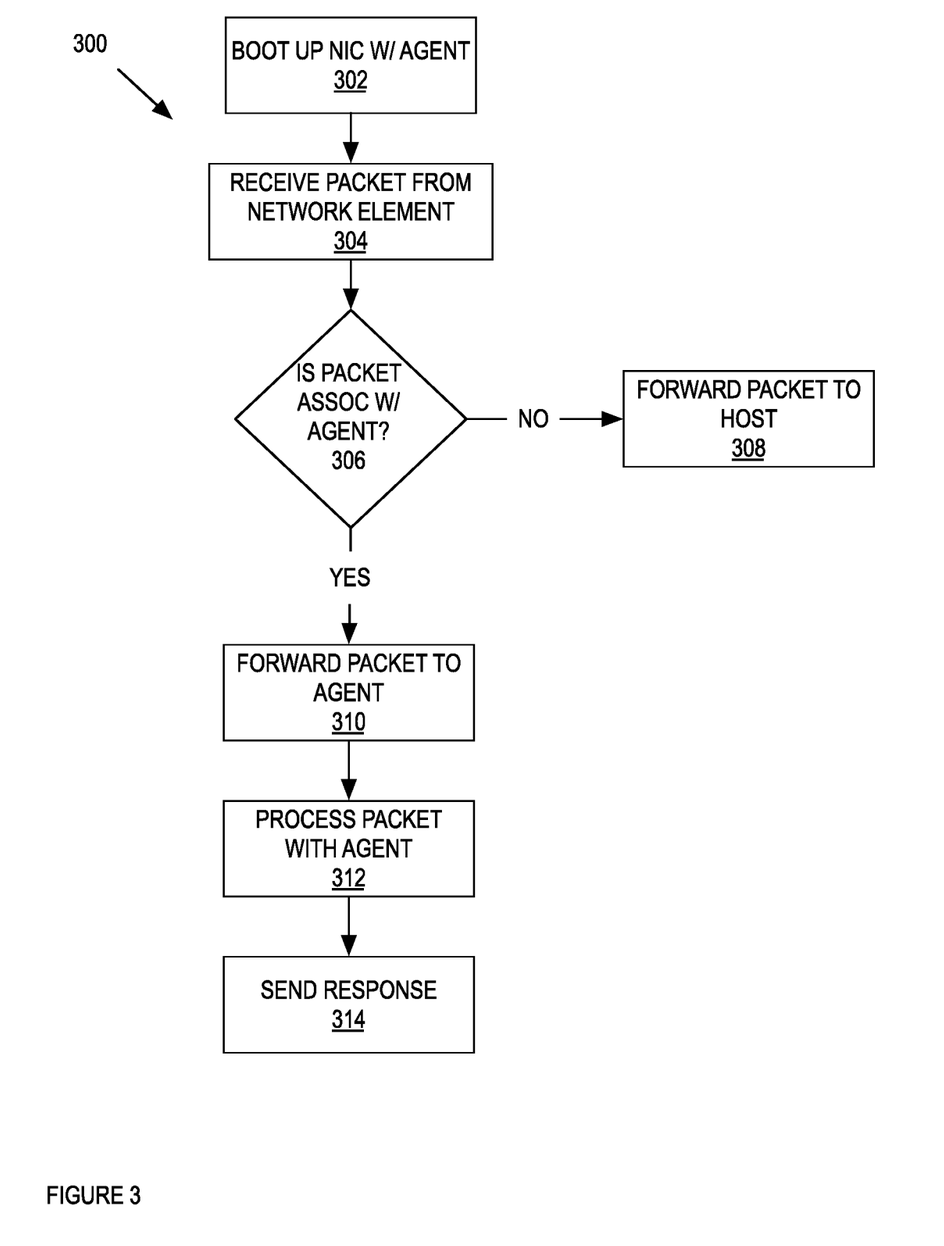
FIG. 3 is flow diagram of one embodiment of a process to receive a command packet from a network element that is processed by an agent on the NIC.

FIG. 3 is flow diagram of one embodiment of a process 300 to receive and process a command packet from a network element that is processed by an agent on the NIC. In one embodiment, a NIC performs process 300 to receive and process a command packet from a network element, such as the NIC 108 as described in FIG. 1 above. In FIG. 1, process 300 begins by booting up the NIC with the agent at block 302. In one embodiment, the agent is installed when the NIC is manufactured. In another embodiment, the NIC can be installed as an upgrade after the NIC is manufactured. At block 304, process 300 receives a packet from the network element on the link between the NIC and the network element. Process 300 determines if the packet is associated with the agent at block 306. In one embodiment, process 300 determines if the packet is associated with the agent by determining if the destination address is a multicast MAC address that is associated with the agent. If the packet is not associated with the agent, process 300 forwards the packet to the host at block 308, where the host processes the packet. If the packet is associated with the agent, process 300 forwards the packet to the agent at block 310. At block 312, process 300 processes the packet. In one embodiment, the agent can examine the content of the packet and determines the response. In this embodiment, the packet can have a protocol and the agent responds accordingly. For example and in one embodiment, the packet can have a Forwarding and Control Element Separation protocol format. In one embodiment, the command in the packet can be a command for a request for information (getting a statistics value, configuration value, and/or a policy), request for discovery (e.g., the discovery packet as described in FIG. 1 above), and/or a command to execute an action (e.g., setting a configuration value or setting a policy). Process 300 sends a response at block 314.

Figure 4:
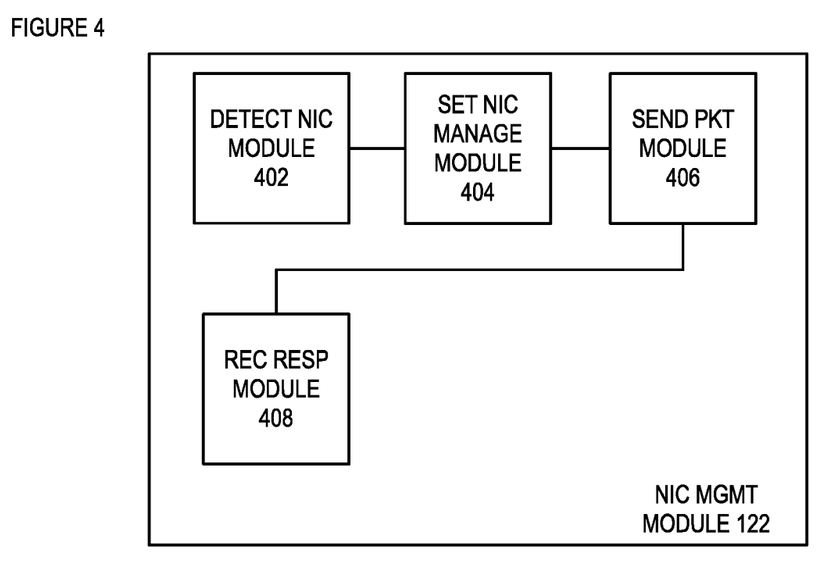
FIG. 4 is a block diagram of one embodiment of a NIC module that sends a command packet to a device NIC that is used to manage the NIC.

FIG. 4 is a block diagram of one embodiment of a NIC management module 122 that sends a command packet to a device NIC that is used to manage the NIC. In one embodiment, the NIC management module 122 includes detect NIC module 402, set NIC manageable module 404, send packet module 406, and receive response module 408. In one embodiment, the detect NIC module 402 detects a manageable NIC as described in FIG. 2, block 202 above. The set NIC manageable module 404 sets the NIC as manageable as described in FIG. 2, block 204 above. The send packet module 406 sends the command packet as described in FIG. 2, block 206 above. The receive response module 408 receives the response as described in FIG. 2, block 208 above.

FIG. 5 is a block diagram of one embodiment of a NIC 108 that receives a command packet from a network element that is processed by an agent on the NIC. In one embodiment, the NIC 108 includes a boot module 502, forward packet module 504, process packet module 506, and send module 508. In one embodiment, the boot module 502 boots up the NIC with the agent as described in FIG. 3, block 302 above. The forward packet module 504 forwards the packet to the CPU or agent as described in FIG. 3, blocks 308 and 310 above. The process packet module 506 processes that packet as described in FIG. 3, block 312 above. The send module 508 sends the response as described in FIG. 3, block 314 above.

Figure 6:
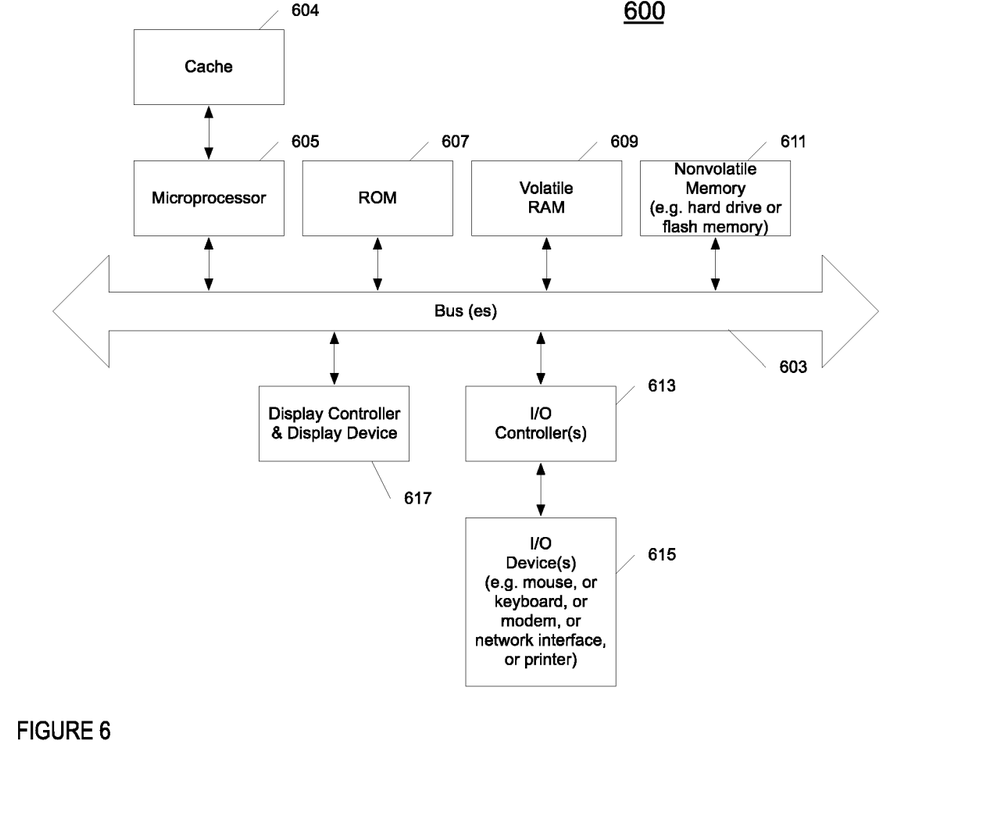
FIG. 6 illustrates one example of a typical computer system, which may be used in conjunction with the embodiments described herein.

FIG. 6 shows one example of a data processing system 600, which may be used with one embodiment of the present invention. For example, the system 600 may be implemented as a network element, including a network element 102 as shown in FIG. 1. Note that while FIG. 6 illustrates various components of a computer system, it is not intended to represent any particular architecture or manner of interconnecting the components as such details are not germane to the present invention. It will also be appreciated that network computers and other data processing systems or other consumer electronic devices, which have fewer components or perhaps more components, may also be used with the present invention.

As shown in FIG. 6, the computer system 600, which is a form of a data processing system, includes a bus 603 which is coupled to a microprocessor(s) 605 and a ROM (Read Only Memory) 607 and volatile RAM 609 and a non-volatile memory 611. The microprocessor 605 may retrieve the instructions from the memories 607, 609, 611 and execute the instructions to perform operations described above. The bus 603 interconnects these various components together and also interconnects these components 605, 607, 609, and 611 to a display controller and display device 617 and to peripheral devices such as input/output (I/O) devices which may be mice, keyboards, modems, network interfaces, printers and other devices which are well known in the art. In one embodiment, the system 600 includes a plurality of network interfaces of the same or different type (e.g., Ethernet copper interface, Ethernet fiber interfaces, wireless, and/or other types of network interfaces). In this embodiment, the system 600 can include a forwarding engine to forward network date received on one interface out another interface.

Typically, the input/output devices 615 are coupled to the system through input/output controllers 613. The volatile RAM (Random Access Memory) 609 is typically implemented as dynamic RAM (DRAM), which requires power continually in order to refresh or maintain the data in the memory.

The mass storage 611 is typically a magnetic hard drive or a magnetic optical drive or an optical drive or a DVD ROM/RAM or a flash memory or other types of memory systems, which maintains data (e.g. large amounts of data) even after power is removed from the system. Typically, the mass storage 611 will also be a random-access memory although this is not required. While FIG. 6 shows that the mass storage 611 is a local device coupled directly to the rest of the components in the data processing system, it will be appreciated that the present invention may utilize a non-volatile memory which is remote from the system, such as a network storage device which is coupled to the data processing system through a network interface such as a modem, an Ethernet interface or a wireless network. The bus 603 may include one or more buses connected to each other through various bridges, controllers and/or adapters as is well known in the art.

Portions of what was described above may be implemented with logic circuitry such as a dedicated logic circuit or with a microcontroller or other form of processing core that executes program code instructions. Thus processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "process virtual machine" (e.g., a Java Virtual Machine), an interpreter, a Common Language Runtime, a high-level language virtual machine, etc.), and/or, electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

The present invention also relates to an apparatus for performing the operations described herein. This apparatus may be specially constructed for the required purpose, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), RAMs, EPROMs, EEPROMs, magnetic or optical cards, or any type of media suitable for storing electronic instructions, and each coupled to a computer system bus.

A machine readable medium includes any mechanism for storing or transmitting information in a form readable by a machine (e.g., a computer). For example, a machine readable medium includes read only memory ("ROM"); random access memory ("RAM"); magnetic disk storage media; optical storage media; flash memory devices; etc.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

Figure 7:
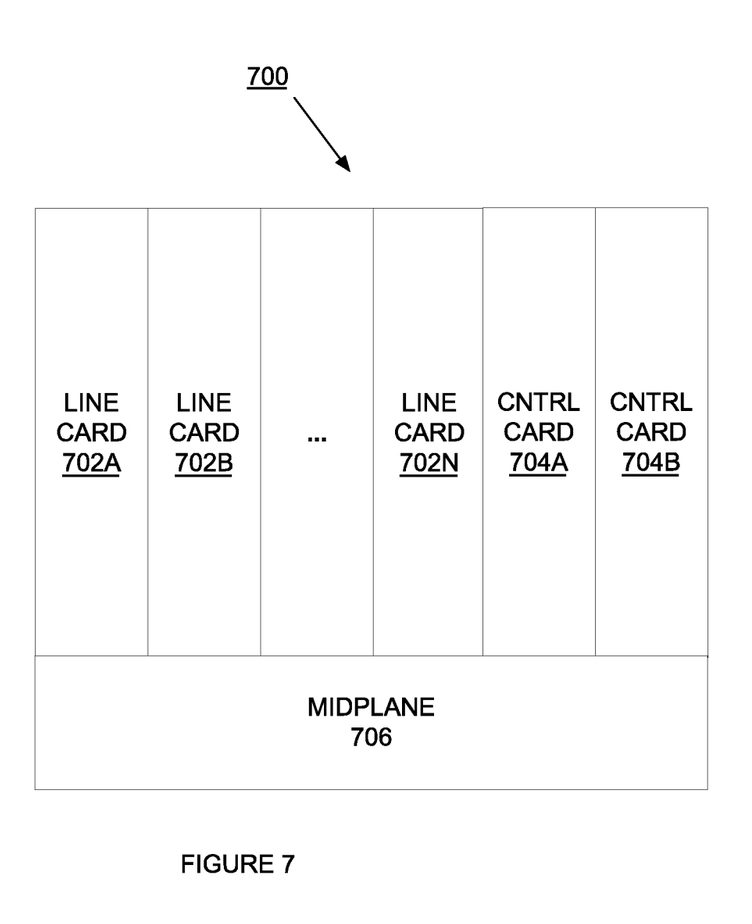
FIG. 7 is a block diagram of one embodiment of an exemplary network element that remotely manages the NIC of a device in-band.

FIG. 7 is a block diagram of one embodiment of an exemplary network element 700 that remotely manages the NIC of a device in-band. In FIG. 7, the midplane 706 couples to the line cards 702A-N and controller cards 704A-B. While in one embodiment, the controller cards 704A-B control the processing of the traffic by the line cards 702A-N, in alternate embodiments, the controller cards 704A-B, perform the same and/or different functions (e.g., managing a NIC in-band as described in FIGS. 1-2 above). In one embodiment, the line cards 702A-N processes network data. It should be understood that the architecture of the network element 700 illustrated in FIG. 7 is exemplary, and different combinations of cards may be used in other embodiments of the invention.

The preceding detailed descriptions are presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving," "detecting," "determining," "forwarding," "preparing," "transmitting," "processing," "performing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The processes and displays presented herein are not inherently related to any particular computer or other apparatus. Various general-purpose systems may be used with programs in accordance with the teachings herein, or it may prove convenient to construct a more specialized apparatus to perform the operations described. The required structure for a variety of these systems will be evident from the description below. In addition, the present invention is not described with reference to any particular programming language. It will be appreciated that a variety of programming languages may be used to implement the teachings of the invention as described herein.

The foregoing discussion merely describes some exemplary embodiments of the present invention. One skilled in the art will readily recognize from such discussion, the accompanying drawings and the claims that various modifications can be made without departing from the spirit and scope of the invention.

What is claimed is:

1. A non-transitory machine-readable medium having executable instructions to cause one or more processing units to perform a method to manage a network interface controller on a host device coupled to a network element, the method comprising:
    providing a discovery packet to an agent of a network interface controller in-band, wherein:
        the agent runs on a processor of the network interface controller;
        the discovery packet includes a non-forwardable address associated with the agent;
        the network interface controller is coupled to the network element by a link,
        the host device comprises a plurality of virtual network interface controllers (VNICs), and
        each VNIC of the plurality of VNICs logically couples the network interface controller to a virtual machine or a container;
    receiving a response from the agent responsive to the discovery packet;
    determining the network interface controller is manageable based on the response;
    transmitting a command packet to the agent in-band, the command packet including the non-forwardable address associated with the agent; and
    receiving another response from the agent responsive to the command packet.

2. The machine-readable medium of claim 1, wherein the address is a non-forwardable destination address.

3. The machine-readable medium of claim 2, wherein the non-forwardable destination address is selected from a group consisting of a multicast media access control address, an Internet Protocol multicast address, and an Internet Protocol link local address.

4. The machine-readable medium of claim 2, wherein the address configures the command packet to be processed by the processor of the network interface controller and not by a processor of the host device.

5. The machine-readable medium of claim 1, wherein:
    a command is stored in the command packet, and
    the command performs at least one of getting a statistics value, getting a configuration value, setting a configuration value, setting a policy, and getting a policy for at least one VNIC.

6. The machine-readable medium of claim 5, wherein the policy is selected from a group consisting of a quality of service, access control list, and a policer.

7. The machine-readable medium of claim 5, wherein the command is stored in a Forwarding and Control Element Separation protocol format.

8. The machine-readable medium of claim 1, wherein an in-band transmission is transmission of the command packet on same link that is being managed.

9. The non-transitory machine-readable medium of claim 1 wherein:
the network interface controller drops packets sent to the non-forwardable address that are not from the network element;
the discovery packet further includes a predetermined port; and
the command packet further includes the predetermined port.

10. A non-transitory machine-readable medium having executable instructions to cause one or more processing units to perform a method, the method comprising:
receiving, by a network interface controller on a device, an in-band discovery packet from a network element via a link that couples the device and the network element, the in-band discovery packet including an address associated with an agent that is executing on a processor of the network interface controller, wherein:
the device comprises a plurality of virtual network interface controllers (VNICs), and
each VNIC of the plurality of VNICs logically couples the network interface controller to a virtual machine or a container;
forwarding the in-band discovery packet to the agent based on the address, the agent producing a first response responsive to the discovery packet;
transmitting the first response to the network element via the link, the network element determining the network interface controller is manageable based on the first response;
receiving another packet from the network element; and
forwarding the another packet to the agent based on the address, wherein:
the agent determines a second response to the another packet by accessing a memory of the network interface controller and without accessing a memory of the device,
the another packet includes a command,
the agent processes the command, and
the agent transmits the second response to the network element via the link.

11. The machine-readable medium of claim 10, wherein the command is configured to perform at least one of getting a statistics value, getting a configuration value, setting a configuration value, setting a policy, and getting a policy for at least one VNIC.

12. The machine-readable medium of claim 10, wherein the packet has a non-forwardable destination address.

13. The machine-readable medium of claim 12, wherein the non-forwardable destination address is selected from a group consisting of a multicast media access control address, an Internet Protocol multicast address, and an Internet Protocol link local address.

14. The machine-readable medium of claim 10, wherein the command is stored in the packet in a Forwarding and Control Element Separation protocol format.

15. A method to manage a network interface controller on a host device coupled to a network element, the method comprising:
providing a discovery packet to an agent of a network interface controller in-band, wherein:
the agent runs on a processor of the network interface controller;
the discovery packet includes a non-forwardable address associated with the agent;
the network interface controller is coupled to the network element by a link,
the host device comprises a plurality of virtual network interface controllers (VNICs), and
each VNIC of the plurality of VNICs logically couples the network interface controller to a virtual machine or a container;
receiving a response from the agent responsive to the discovery packet;
determining the network interface controller is manageable based on the response;
transmitting a command packet to the network interface controller in-band, the command packet transmitting a command to the agent in-band, the command packet including the non-forwardable address associated with the agent; and
receiving another response from the agent responsive to the command packet.

16. The method of claim 15, wherein the address is a non-forwardable destination address.

17. The method of claim 16, wherein the non-forwardable destination address is selected from a group consisting of a multicast media access control address, an Internet Protocol multicast address, and an Internet Protocol link local address.

18. The method of claim 16, wherein the address configures the command packet to be processed by the processor of the network interface controller and not the by a processor of the host device.

19. A method comprising:
receiving, by a network interface controller on a device, an in-band discovery packet from a network element via a link that couples the device and the network element, the in-band discovery packet including an address associated with an agent that is executing on a processor of the network interface controller, wherein:
the device comprises a plurality of virtual network interface controllers (VNICs), and
each VNIC of the plurality of VNICs logically couples the network interface controller to a virtual machine or a container;
forwarding the in-band discovery packet to the agent based on the address, the agent producing a first response responsive to the discovery packet;
transmitting the first response to the network element via the link, the network element determining the network interface controller is manageable based on the first response;
receiving another packet from the network element; and
forwarding the another packet to the agent based on the address, wherein:
the agent determines a second response to the another packet by accessing a memory of the network interface controller and without accessing a memory of the device,
the another packet includes a command,
the agent processes the command, and
the agent transmits the second response to the network element via the link.

20. The method of claim 19, wherein the command is configured to set a configuration of at least one VNIC or to retrieve information about the at least one VNIC.

* * * * *